US011739476B2

(12) United States Patent
Min et al.

(10) Patent No.: US 11,739,476 B2
(45) Date of Patent: Aug. 29, 2023

(54) METHOD OF PREPARING WATER-BASED SURFACE TREATMENT AGENT AND WATER-BASED SURFACE TREATMENT AGENT PREPARED USING THE SAME

(71) Applicant: LG HAUSYS, LTD., Seoul (KR)

(72) Inventors: Chul Hee Min, Seoul (KR); Yongbae Jung, Seoul (KR); Inhyuk Lee, Seoul (KR)

(73) Assignee: LG Hausys, Ltd., Seoul (KR)

( * ) Notice: Subject to any disclaimer, the term of this patent is extended or adjusted under 35 U.S.C. 154(b) by 544 days.

(21) Appl. No.: 16/641,935

(22) PCT Filed: Sep. 11, 2018

(86) PCT No.: PCT/KR2018/010646
§ 371 (c)(1),
(2) Date: Feb. 25, 2020

(87) PCT Pub. No.: WO2019/054730
PCT Pub. Date: Mar. 21, 2019

(65) Prior Publication Data
US 2020/0248402 A1  Aug. 6, 2020

(30) Foreign Application Priority Data

Sep. 14, 2017 (KR) .................. 10-2017-0117553
Nov. 22, 2017 (KR) .................. 10-2017-0156793

(51) Int. Cl.
| C09D 7/65 | (2018.01) |
| C09D 175/04 | (2006.01) |
| B32B 38/06 | (2006.01) |
| B32B 5/18 | (2006.01) |
| D06N 3/14 | (2006.01) |
| D06N 3/06 | (2006.01) |
| B32B 5/02 | (2006.01) |
| B32B 5/24 | (2006.01) |
| B32B 27/06 | (2006.01) |
| B32B 27/30 | (2006.01) |
| B32B 38/00 | (2006.01) |
| D06N 3/00 | (2006.01) |
| B29C 59/04 | (2006.01) |
| B29C 59/06 | (2006.01) |
| B60N 2/58 | (2006.01) |

(52) U.S. Cl.
CPC ............. *D06N 3/14* (2013.01); *B29C 59/046* (2013.01); *B29C 59/06* (2013.01); *B32B 5/022* (2013.01); *B32B 5/024* (2013.01); *B32B 5/18* (2013.01); *B32B 5/245* (2013.01); *B32B 27/065* (2013.01); *B32B 27/304* (2013.01); *B32B 38/0008* (2013.01); *B32B 38/06* (2013.01); *C09D 7/65* (2018.01); *C09D 175/04* (2013.01); *D06N 3/0077* (2013.01); *D06N 3/06* (2013.01); *B32B 2266/0235* (2013.01); *B32B 2601/00* (2013.01); *B32B 2605/003* (2013.01); *B32B 2605/08* (2013.01); *B60N 2/5891* (2013.01); *D06N 2211/28* (2013.01); *D10B 2505/12* (2013.01)

(58) Field of Classification Search
CPC .............................. C09D 7/65; C09D 175/04; B32B 2266/0235; B32B 2601/00; B32B 2605/003; B32B 2605/08; B32B 5/022; B32B 5/024; B32B 5/18; B32B 5/245; B32B 27/065; B32B 27/304; B32B 38/0008; B32B 38/06; D06N 3/14; D06N 3/06; D06N 3/0077; D06N 2211/28; D10B 2505/12; B60N 2/5891
USPC ........................................................ 524/591
See application file for complete search history.

(56) References Cited

U.S. PATENT DOCUMENTS

2007/0224362 A1* 9/2007 Briand ................ C09D 163/00
523/401

FOREIGN PATENT DOCUMENTS

| KR | 1995-0018350 A | | 7/1995 |
| KR | 10-1996-0703143 A | | 6/1996 |
| KR | 10-2006-0094134 A | | 8/2006 |
| KR | 2006094134 A | * | 8/2006 |
| KR | 101082236 | * | 11/2011 |
| KR | 10-2012-0126814 A | | 11/2012 |
| KR | 10-1470611 B1 | | 12/2014 |
| KR | 10-2015-0117313 A | | 10/2015 |
| KR | 20170006665 A | * | 1/2017 |

* cited by examiner

*Primary Examiner* — Kelechi C Egwim
(74) *Attorney, Agent, or Firm* — Bryan Cave Leighton Paisner LLP

(57) ABSTRACT

The present invention relates to a method of preparing a water-based surface treatment agent and a water-based surface treatment agent prepared using the same. More particularly, the present invention relates to a water-based surface treatment agent used to form a surface treatment layer included in artificial leather for automobile seat covers and a method of preparing the water-based surface treatment agent. According to the present invention, when the water-based surface treatment agent is used to manufacture artificial leather, occurrence of whitening of the surface of the artificial leather may be prevented.

3 Claims, 1 Drawing Sheet

[FIG. 1]
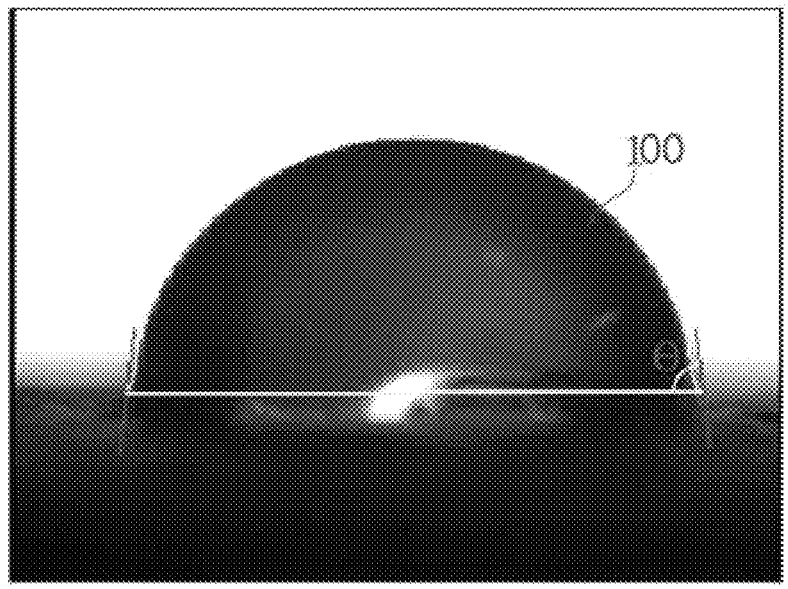
[FIG. 2]
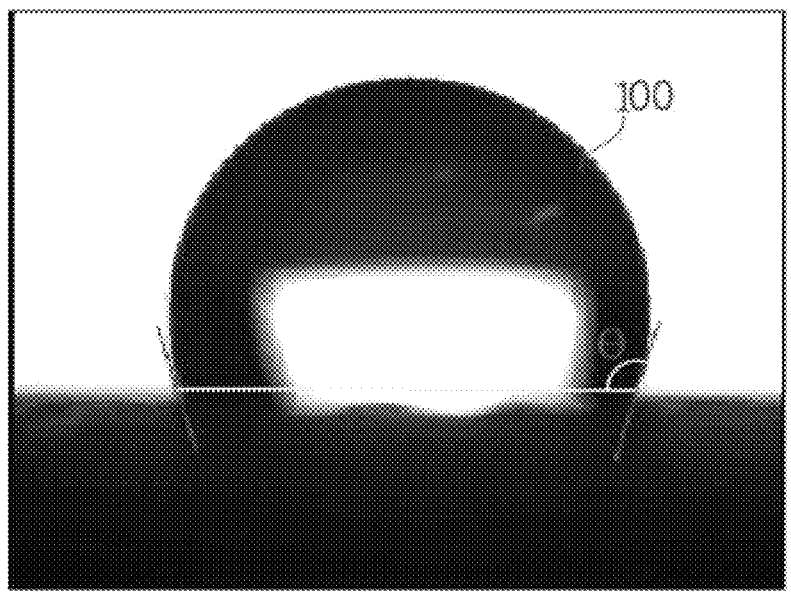

METHOD OF PREPARING WATER-BASED SURFACE TREATMENT AGENT AND WATER-BASED SURFACE TREATMENT AGENT PREPARED USING THE SAME

This application is a National Stage Entry of International Application No. PCT/KR2018/010646, filed on Sep. 11, 2018, and claims the benefit of and priority to Korean Application No. 10-2017-0117553, filed on Sep. 14, 2017, and Korean Application No. 10-2017-0156793, filed on Nov. 22, 2017 all of which are hereby incorporated by reference in their entirety for all purposes as if fully set forth herein.

TECHNICAL FIELD

The present invention relates to a method of preparing a water-based surface treatment agent and a water-based surface treatment agent prepared using the same. More particularly, the present invention relates to a water-based surface treatment agent used to form a surface treatment layer included in artificial leather for automobile seat covers and a method of preparing the water-based surface treatment agent. According to the present invention, when the water-based surface treatment agent is used to manufacture artificial leather, occurrence of whitening in the surface of the artificial leather may be prevented.

BACKGROUND ART

Conventional artificial leather has a structure in which a back layer, a foam layer, a skin layer, and a surface treatment layer are laminated from the bottom to the top.

The surface treatment layer is formed by coating the upper surface of the skin layer with a surface treatment agent. In this case, when the surface treatment layer is formed using an oil-based surface treatment agent, due to organic solvents, a large amount of volatile organic compounds (VOCs) may be released, which generates unpleasant odor. To reduce the amount of VOCs, as in KR 10-1995-0018350 A, research on water-based surface treatment agents has been conducted.

However, according to a conventional method, when a water-based surface treatment agent is prepared, a main material, a curing agent, and water are mixed in a random order. Accordingly, whitening may occur on the surface of artificial leather.

RELATED ART DOCUMENTS

Patent Documents (Patent Document 1) KR 10-1995-0018350 A (Publication date: Jul. 22, 1995)

DISCLOSURE

Technical Problem

Therefore, the present invention has been made in view of the above problems, and it is one object of the present invention to provide a method of preparing a water-based surface treatment agent that does not cause whitening of the surface of artificial leather.

It is another object of the present invention to provide a water-based surface treatment agent prepared using the water-based surface treatment agent preparation method, wherein the water-based surface treatment agent does not cause whitening.

Technical Solution

In accordance with one aspect of the present invention, provided is a method of preparing a water-based surface treatment agent, including:

(a) adding a curing agent (B) to a water-based solvent (C) and performing stirring;

(b) stirring a main material (A), a silicon compound (D), and an additive; and (c) adding the mixture of step (a) to the mixture of step (b) and performing stirring.

In accordance with another aspect of the present invention, provided is a water-based surface treatment agent prepared by the method of preparing a water-based surface treatment agent.

Advantageous Effects

A water-based surface treatment agent prepared using a water-based surface treatment agent preparation method of the present invention does not cause whitening of the surface of artificial leather.

In addition, compared to a conventional oil-based surface treatment agent, when the water-based surface treatment agent of the present invention is used, antifouling properties can be improved and the amount of VOCs generated can be significantly reduced, thereby improving coating properties.

DESCRIPTION OF DRAWINGS

FIG. 1 is an image showing the degree of condensation of liquid when measuring the surface tension of a surface treatment layer formed using an oil-based surface treatment agent.

FIG. 2 is an image showing the degree of condensation of liquid when measuring the surface tension of a surface treatment layer formed using a water-based surface treatment agent according to the present invention.

BEST MODE

The present invention relates to a method of preparing a water-based surface treatment agent, the method including (a) a step of adding a curing agent B to a water-based solvent C and performing stirring;

(b) a step of stirring a main material A, a silicon compound D, and an additive; and (c) a step of adding the mixture of step (a) to the mixture of step (b) and performing stirring.

In addition, step (a) may be a step of adding the curing agent B to the water-based solvent C and performing stirring at 20 to 30° C. or 23 to 26° C. for 40 minutes to 5 hours or 1 to 3 hours. When the stirring time is below the above range, since the water-based solvent C and the curing agent B are not sufficiently stirred, the unreacted curing agent B upon mixing with the main material A in step (b) may react rapidly with the main material A, causing a shocking phenomenon. As a result, surface crosslinking density may be reduced, workability may be degraded, and whitening may occur on the surface of artificial leather. Thus, stirring is preferably performed for the above time range.

Whitening, a type of color defect, refers to a phenomenon in which white dots appear on the surface of artificial leather after application of the water-based surface treatment agent.

In addition, when the water-based solvent C is added to the curing agent B, viscosity may rapidly increase, thereby decreasing surface crosslinking density, degrading light resistance, heat resistance, and scratch resistance, and causing whitening of the surface of artificial leather. Thus, preferably, the curing agent B is added to the water-based solvent C.

The water-based solvent C may include water, an alcohol, or a mixture thereof.

In addition, the alcohol may include one or more selected from the group consisting of methanol, ethanol, propanol, and butanol. Due to the presence of the alcohol, reaction stability and stability of a water-based surface treatment agent may be ensured when components constituting the water-based surface treatment agent are mixed.

Due to the presence of the water-based solvent C, an interpenetrating polymer network in which the main material A and a curing agent not participating in three-dimensional crosslinking reaction are entangled with each other may be formed. In addition, the amount of volatile organic compounds (VOCs) generated by use of organic solvents may be reduced, and as a result, the amount of odor substances released from the VOCs may be reduced.

The water-based solvent C may be included in an amount of 1 to 25 parts by weight, 5 to 20 parts by weight, or 10 to 20 parts by weight based on 100 parts by weight of the main material A.

In addition, the curing agent B, which is added to the water-based solvent C in step (a), may include one or more functional groups selected from the group consisting of an aziridine group, an isocyanate group, and a carbodiimide group per molecule.

Specifically, the compound having an aziridine group refers to a compound including a hetero tricyclic ring composed of two carbon atoms and one nitrogen atom, and may include one or more compounds selected from the group consisting of 3-(3-methoxyphenyl)-3-(trifluoromethyl)-diaziridine; 3-(trifluoromethyl)-3-phenyldiaziridine; propane-2,2-diyldibenzene-4,1-diyldiaziridine-1-carboxylate; 1,1'-(butylphosphoryl)diaziridine; oxydiethane-2,1-diyldiaziridine-1-carboxylate; 3,3-bis(1,1-difluoro-hexyl)-[1,2]diaziridine; 1-aziridinepropanoic acid; 2-methyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl-]-1,3-propanediylester; 2-ethyl-2-[[3-(2-methyl-1-aziridinyl)-1-oxopropoxy]methyl]-1,3-propanediylbis(2-methyl-1-aziridinepropanoate); pentaerythritol tris[3-(1-aziridinyl)propionate]; pentaerythritol tris(3-aziridinopropionate); and combinations thereof.

For example, the compound having an isocyanate group may include one or more selected from the group consisting of toluene diisocyanate, diphenylmethane diisocyanate, modified diphenylmethane diisocyanates, naphthalene diisocyanate, phenylene diisocyanate, hexamethylene diisocyanate, lysine isocyanate, cyclohexane diisocyanate, 3-isocyanatomethyl-3,5,5-trimethylcyclohexyl isocyanate, isophorone diisocyanate, methylenediphenyl isocyanate, xylene diisocyanate, tetramethylxylene diisocyanate, norbornene diisocyanate, triphenylmethane triisocyanate, polyphenyl polymethylene polyisocyanate, polyisocyanates including a carbodiimide group, polyisocyanates including an allophanate group, polyisocyanates including an isocyanurate group, and combinations thereof.

The compound having a carbodiimide group may include polycarbodiimides.

The curing agent B may be included in an amount of 1 to 25 parts by weight, 5 to 20 parts by weight, or 10 to 20 parts by weight based on 100 parts by weight of the main material A. When the content of the curing agent B is below the above range, incomplete curing may occur, thereby degrading physical properties such as light resistance, heat resistance, scratch resistance, wear resistance, solvent resistance, and hydrolysis resistance. When the content of the curing agent B exceeds the above range, whitening may occur on the surface of artificial leather, or ductility may be degraded. Thus, the curing agent B is preferably included in an amount within the above range.

Step (b) may be a step of stirring the main material A, the silicon compound D, and the additive at 20 to 30° C. or 23 to 26° C.

The main material A is described as follows.

Main Material A-1

For example, according to the present invention, the main material A included in the water-based surface treatment agent may be a main material A-1 prepared by dispersing, in a water-based solvent, a polyurethane having one or more functional groups selected from the group consisting of a carboxylic acid group, a hydroxyl group, an amino group, and a combination thereof per molecule.

Among the above-mentioned polyurethanes, as an example of a method of preparing a polyurethane having a carboxylic acid group, there is a method of performing urethanation using a compound having a carboxylic acid group as a raw material. For example, the compound having a carboxylic acid group used as a raw material for the polyurethane may include 2,2'-dimethylol propionic acid, 2,2'-dimethylol butanoic acid, 2,2'-dimethylol butyric acid, 2,2'-dimethylol pentanoic acid, and the like.

In addition, among the above-mentioned polyurethanes, as an example of a method of preparing a polyurethane having a hydroxyl group, there is a method of obtaining a polyurethane having a hydroxyl group at the terminal thereof by reacting an excess of a polyol and/or glycol with polyisocyanate. For example, a compound having a hydroxyl group used as a raw material for the polyurethane may include polyolefin polyols, such as polyester polyols, polyether polyols, polycarbonate polyols, polyacetal polyols, polyacrylate polyols, polyester amide polyols, polythioether polyols, and polybutadiene polyols.

In addition, among the above-mentioned polyurethanes, as an example of a method of preparing a polyurethane having an amine group, there is a method of obtaining a polyurethane having an amine group by reacting a urethane prepolymer having an isocyanate group at the terminal thereof with an aminoalcohol, such as 2-ethanolamine, 2-aminoethyl ethanolamine, and diethanolamine, an aminophenol or the like.

Preferably, a polycarbonate-based polyurethane using the polycarbonate polyol having excellent heat resistance and light resistance as a raw material is used as the polyurethane.

According to the present invention, the content of the polyurethane in the main material A-1 may be 5 to 30% by weight or 10 to 25% by weight. When the content of the polyurethane is below the above range, feel, scratch resistance, light resistance, heat resistance, wear resistance, and solvent resistance may be degraded. When the content of the polyurethane exceeds the above range, whitening and smudges may occur. Thus, the polyurethane is preferably included in an amount within the above range.

Main Material A-2

As another example, the main material A may be a main material A-2 prepared by dispersing, in a water-based solvent, an acrylic-modified polyurethane further including an acrylate in the main chain thereof.

The content of the acrylic-modified urethane in the main material A-2 may be 1 to 10% by weight or 2 to 8% by weight. When the content of the acrylic-modified urethane is below the above range, contamination resistance may be degraded, and texture may be slippery. When the content of the acrylic-modified urethane exceeds the above range, ductility may be degraded, and texture may be dry. Thus, the acrylic-modified urethane is preferably included in an amount within the above range.

In addition, the main material A-2 may further include a siloxane to facilitate water dispersion in the acrylic-modified polyurethane and to enhance an antifouling effect.

Preferably, the siloxane includes one or more methyl groups to secure an antifouling effect, excellent compatibility with the acrylic-modified polyurethane, and excellent hardness.

The siloxane may be included in an amount of 0.01 to 2% by weight or 0.05 to 1.5% by weight in the main material A-2. When the content of the siloxane is below the above range, an antifouling effect may be reduced. When the content of the siloxane exceeds the above range, the siloxane may migrate to the surface of artificial leather, resulting in excessive gloss of the surface of the artificial leather. In addition, when the surface of the artificial leather is rubbed by one's hand, the hand may be stained with the siloxane. Thus, the siloxane is preferably included in an amount within the above range.

Main Material A-3

As yet another example, the main material A of the present invention may be obtained by mixing the main material A-1 and the main material A-2.

The main material A-1 and the main material A-2 may be mixed in a weight ratio of 1:9 to 4:6, or 2:8 to 3:7. When the content of the main material A-1 is below the above range, the surface texture of artificial leather may not be soft. When the content of the main material A-1 exceeds the above range, an antifouling effect may be reduced. Thus, the main material A-1 and the main material A-2 are preferably mixed in a ratio within the above range.

In step (b), the silicon compound D may be a polysiloxane of a liquid form dispersed in water or a polysiloxane of a bead form. Preferably, to improve surface texture, the silicon compound D is a polysiloxane of a liquid form dispersed in water.

In the silicon compound of a liquid form, a polysiloxane may be included in an amount of 5 to 30% by weight or 10 to 20% by weight.

The silicon compound may be included in an amount of 1 to 15 parts by weight, 1 to 10 parts by weight, or 5 to 7 parts by weight based on 100 parts by weight of the main material A.

When the content of a polysiloxane in the silicon compound is below the above range, and when the content of the silicon compound mixed with the main material is below the above range, an antifouling effect may be reduced. When the content of a polysiloxane exceeds the above range, and when the content of the silicon compound exceeds the above range, surface texture may be excessively slippery. As a result, although a squeak index may be minimized, a proper level of coefficient of kinetic friction may not be obtained, resulting in poor seating feeling. Thus, the content of a polysiloxane and the content of the silicon compound are preferably used within the above range.

More specifically, the squeak index is a value of noise generated by friction between artificial leather and the human body, i.e., a passenger. When measuring a squeak index using a universal testing machine, an artificial leather specimen is folded up and down and is pressed with a weight of 4.5 kg, and a force deviation ($\Delta F$) and average force (Fa) required to pull the specimen at a speed of 100 mm/min are measured. Then, a squeak index is calculated by a formula of $\Delta F$/Fa.

The squeak index may be less than 0.15, or 0.14 or less. Within this range, noise may be reduced, and surface texture may be soft.

When the squeak index exceeds the above range, noise may be severe, and stick slip, which is a friction phenomenon accompanied by vibration, may be enhanced. Thus, the artificial leather is preferably manufactured to have a squeak index within the above range.

The coefficient of kinetic friction ($\mu$) is a coefficient associated with force that prevents slipping when one object slides in contact with another object. When measuring a coefficient of kinetic friction using a universal testing machine, an artificial leather specimen is folded up and down and is pressed with a weight of 4.5 kg (W), and average force (Fa) required to pull the specimen at a speed of 300 mm/min is measured. Then, a coefficient of kinetic friction is calculated by a formula of Fa/W.

The artificial leather of the present invention may have a coefficient of kinetic friction of 0.2 to 0.5 or 0.25 to 0.5. When the coefficient of kinetic friction of the artificial leather is below the above range, slipping may not be prevented, resulting in poor seating feeling. When the coefficient of kinetic friction of the artificial leather exceeds the above range, a squeak index may be increased due to friction between artificial leather and a passenger. Thus, the artificial leather is preferably manufactured to have a coefficient of kinetic friction within the above range.

In addition, in step (b), the additive may be an antifoaming agent or a leveling agent.

Since the water-based surface treatment agent has a higher viscosity than an oil-based surface treatment agent, the antifoaming agent is included to prevent generation of a large number of bubbles during coating. For example, the antifoaming agent may be selected from a silicon resin, a surfactant, paraffin wax, or mineral oil, without being limited thereto.

The antifoaming agent may be included in an amount of 0.1 to 0.5 parts by weight based on 100 parts by weight of the main material A. When the content of the antifoaming agent is below the above range, a large number of bubbles may be generated during coating of the water-based surface treatment agent, thereby degrading workability. When the content of the antifoaming agent exceeds the above range, physical properties may be degraded. Thus, the antifoaming agent is preferably included in an amount within the above range.

The leveling agent is added to provide a uniform coating surface, and may be selected from a silicon resin or an acryl resin, without being limited thereto.

The leveling agent may be included in an amount of 1 to 5 parts by weight based on 100 parts by weight of the main material A. When the content of the leveling agent is below the above range, a coating surface may not be uniform when coated with the water-based surface treatment agent. When the content of the leveling agent exceeds the above range, physical properties may be degraded. Thus, the leveling agent is preferably included in an amount within the above range.

In addition, in step (b), the mixture may optionally include one or more additives selected from the group consisting of urethane beads, acryl beads, and fluorinated wax.

When the additive is included, an antifouling effect may be implemented by hydrophobicity, and the surface tension of the water-based surface treatment agent may be reduced, thereby increasing slippery texture.

The additive may be included in an amount of 1 to 10% by weight or 2 to 5% by weight in the water-based surface treatment agent. Within this range, dyeing of the water-based surface treatment agent by other substances, such as dyes, may be prevented, and the effect of reducing surface energy may be easily realized.

In addition, depending on the role of the water-based surface treatment agent, the water-based surface treatment agent may include one or more selected from surfactants, cosolvents, modifiers, quenchers, brighteners, thickeners, and quenchers, and the kind and content thereof are not particularly limited.

Step (c) may be a step of stirring the mixture of step (a) and the mixture of step (b) at 20 to 30° C. or 23 to 26° C. for 0.2 to 1 hour or 0.3 to 0.8 hours.

In addition, the present invention relates to a water-based surface treatment agent prepared by the method of preparing a water-based surface treatment agent.

The water-based surface treatment agent prepared the above-described method may have a viscosity of 150 to 700 cps or 200 to 600 cps at 25° C. When the viscosity of the water-based surface treatment agent is below the above range, the texture of artificial leather may not be soft and may be relatively stiff. In addition, a coating solution may flow down, thereby reducing coating efficiency. When the viscosity of the water-based surface treatment agent exceeds the above range, it is difficult to perform gravure coating. Thus, the water-based surface treatment agent having a viscosity within the above range is preferably used. The viscosity of the water-based surface treatment agent is higher than that of a conventional oil-based surface treatment agent, and the upper surface of a skin layer may be easily coated with the water-based surface treatment agent.

In addition, the water-based surface treatment agent prepared using the above method is applied to the upper surface of a base material for artificial leather, and drying is performed at 110 to 150° C. or 130 to 150° C. for 80 to 120 seconds to evaporate a water-based solvent. Through this process, the surface of artificial leather may be formed.

When drying temperature and drying time are below the above ranges, incomplete curing may occur due to incomplete evaporation of the water-based solvent, which causes occurrence of whitening on the surface of artificial leather and degrades surface physical properties. When drying temperature and drying time exceed the above range, heat resistance may be degraded, leading to discoloration of the water-based surface treatment agent. Thus, drying is preferably performed within the above temperature and time ranges.

In addition, in the water-based surface treatment agent prepared using the above-described method, by adding the curing agent B to the water-based solvent C, performing stirring sufficiently, and then mixing the mixture with the main material A, an interpenetrating polymer network in which a curing agent not participating in three-dimensional crosslinking reaction is entangled may be formed between polyurethane in the main material A. Accordingly, the antifouling properties of a surface treatment layer may be improved, and the surface crosslinking density of the surface treatment layer may be increased while reducing surface tension.

In addition, compared to a conventional oil-based surface treatment agent, when the water-based surface treatment agent prepared using the method of preparing a water-based surface treatment agent according to the present invention is used, antifouling properties may be improved and the amount of VOCs generated may be significantly reduced.

In addition, whitening may not occur on the surface of artificial leather to which the water-based surface treatment agent prepared using the method is applied.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

1. Preparation of Water-Based Surface Treatment Agent

Example 1

(a) First, 5 parts by weight of a curing agent including hexamethylene diisocyanate and polyisocyanate was added to 20 parts by weight of a water-based solvent including 15 parts by weight of water and 5 parts by weight of isopropyl alcohol, and then stirring was performed at 25° C. for 1 hour.

(b) In addition, as a silicon compound of a liquid form prepared by dispersing a polysiloxane in water, 5 parts by weight of a silicon compound including 75% by weight of water and 15% by weight of a polysiloxane, 0.2 parts by weight of an antifoaming agent, and 2 parts by weight of a leveling agent were added to 100 parts by weight of a polycarbonate-based polyurethane resin, as a main material, including 50% by weight of water and 20% by weight of a polyurethane.

(c) Subsequently, the mixture containing the curing agent and the water-based solvent was added to the mixture containing the main material, the silicon compound, and the additive, and then stirring was performed at 25° C. for 0.5 hours to prepare a water-based surface treatment agent.

Example 2

A water-based surface treatment agent was prepared using the same composition and preparation method as in Example 1, except that, in step (b), a polycarbonate-based polyurethane resin, as a main material, including 60% by weight of water, 7% by weight of an acrylic-modified urethane, and 0.15% by weight of a siloxane was used.

Example 3

A water-based surface treatment agent was prepared using the same composition and preparation method as in Example 1, except that, in step (b), a polycarbonate-based polyurethane resin, as a main material, containing the main material of Example 1 and the main material of Example 2 in a weight ratio of 2:8 was used.

Comparative Example 1

An oil-based surface treatment agent including 95% by weight of a urethane acrylate as a main material and 5% by weight of methylene dicyclohexyl diisocyanate as a curing agent was prepared.

Reference Example 1

A water-based surface treatment agent was prepared in the same manner as in Example 1, except that, in step (a), the curing agent was added to the water-based solvent, and then stirring was performed at 25° C. for 0.5 hours.

Reference Example 2

A water-based surface treatment agent was prepared in the same manner as in Example 1, except that, in step (a), 30 parts by weight of the curing agent was added to 20 parts by weight of the water-based solvent.

Reference Example 3

A water-based surface treatment agent was prepared in the same manner as in Example 1, except that, in step (a), the water-based solvent was added to the curing agent.

Reference Example 4

A water-based surface treatment agent was prepared in the same manner as in Example 1, except that, in step (a), the main material and the curing agent were stirred, and then the water-based solvent was added to the mixture containing the main material and the curing agent.

2. Formation of Surface Treatment Layer

The surface treatment agents prepared in Examples 1 to 3, Comparative Example 1, and Reference Examples 1 to 4 were applied to a base material, and drying was performed at 140° C. for 90 seconds to prepare a specimen including the base material on which a surface treatment layer was formed.

Reference Example 5

A specimen including a surface treatment layer was manufactured in the same manner as in Example 1, except that the water-based surface treatment agent prepared in Example 1 was applied to a base material, and drying was performed at 100° C.

3. Measurement of Physical Properties

For specimens manufactured in Examples 1 to 3, Comparative Example 1, and Reference Examples 1 to 5, antifouling properties, the amount of volatile organic compounds (VOCs) generated, surface crosslinking density, surface tension, viscosity, odor, and occurrence of whitening were measured, and the results are shown in Table 2 below.

Antifouling Properties

The above-manufactured specimen was mounted on a universal wear tester (Toyoseiki), cotton soil test cloth was placed on the upper surface of the specimen, and a constant load of 0.9 kg was applied thereto.

At this time, by applying a pressure of 0.14 kgf/cm$^2$ to a rubber diaphragm, the specimen was contaminated with 500 cycles, and after replacing the contaminated cloth, the specimen was contaminated with 500 cycles again.

The contaminated specimen was placed in the opening of a colorimeter, a green filter was mounted, and a reflection value at an uncontaminated region of the specimen was measured. A reflection value (%) was measured in an intermediate polished portion between the center and outside of a contaminated region, and the average value (%) for contamination was calculated.

Amount of Volatile Organic Compounds (VOCs) Generated

When measuring the amount of volatile organic compounds (VOCs) generated, an artificial leather specimen was prepared. The specimen was placed in a 4 L glass desiccator, and the desiccator was sealed, followed by heating in an oven for 2 hours. After heating, the desiccator was left in a laboratory at 25° C. for 1 hour. Then, the lid of the desiccator was opened about 3 to 4 cm, and VOCs emitted from the specimen were collected. The amount of the collected VOCs was measured using a measurement apparatus.

Surface Crosslinking Density

Surface crosslinking density was determined by measuring the amount of crosslinked urethane that was insoluble in boiling xylene or decahydronaphthalene. Specifically, a specimen (m1) was weighed up to 1 mg using a chemical balance, and the specimen was placed on a net or a container made of a perforated metal plate. Subsequently, the container was soaked in boiling xylene or decahydronaphthalene and was left for 6 to 8 hours.

Thereafter, the container containing residues was taken out of the boiling solvent, cooled to room temperature and dried, and a residual amount (m2) was weighed up to 1 mg.

Surface crosslinking density (%) G was calculated by a formula of m2/m1×100.

Surface Tension (Dyne Test)

Referring to FIGS. 1 and 2, when spreading a liquid having a specific tension of 20 to 60° on a specimen using a pen (dyne pen) containing the liquid, when the tension of the liquid is greater than the surface tension of the specimen, the liquid does not spread on the specimen, and the liquid is condensed to maintain the spherical shape. When the tension of the liquid is less than the surface tension of the specimen, the liquid spreads flat and is easily applied to the specimen.

At this time, the internal angle ($\theta$) of the liquid 1 is measured.

The angle is inversely proportional to the surface tension of a specimen.

Viscosity

Viscosity was measured using a Brookfield viscometer.

First, a surface treatment agent was warmed to a temperature of 25° C., the surface treatment agent was placed in a cylindrical container having a volume of 600 ml or more and a wide bottom, and the spindle #64 was positioned at the center of the container.

Subsequently, a viscometer was slowly lowered so that the viscometer was immersed to a marked position of a spindle, and the spindle was rotated at 30 rpm to measure viscosity.

Odor

According to a sensory test method, a panel of three or more evaluators directly smelled and evaluated the degree of odor. In Table 1 below, the degree of odor according to direct sensory evaluation is shown. The levels of odor are divided into 6 levels from level 1 to level 6. As the level increases, the severity of odor increases.

TABLE 1

| Odor level | Odor expression |
|---|---|
| 1 | No odor |
| 2 | Difficult to sense odor |
| 3 | Possible to sense odor, but odor is not severe enough to cause disgust |
| 4 | Easy to sense odor, and odor causes slight disgust. |
| 5 | Odor is severe enough to cause disgust. |
| 6 | Irritating and strong odor |

Whitening

The presence or absence of white dots generated on the surface (i.e., surface treatment layer) of artificial leather was visually confirmed.

(○: whitening occurred, ×: no whitening)

TABLE 2

| | Example 1 | Example 2 | Example 3 | Comparative Example 1 | Reference Example 1 | Reference Example 2 | Reference Example 3 | Reference Example 4 | Reference Example 5 |
|---|---|---|---|---|---|---|---|---|---|
| Antifouling properties (%) | 5 | 4.5 | 4.9 | 10 | 7 | 5 | 7 | 7 | 6 |
| Amount of VOCs generated (μg/m$^2$) | 220 | 220 | 220 | 800 | 220 | 220 | 220 | 220 | 220 |

TABLE 2-continued

| | Example 1 | Example 2 | Example 3 | Comparative Example 1 | Reference Example 1 | Reference Example 2 | Reference Example 3 | Reference Example 4 | Reference Example 5 |
|---|---|---|---|---|---|---|---|---|---|
| Surface crosslinking density (%) | 80 | 85 | 82 | 90 | 70 | 80 | 70 | 70 | 75 |
| Surface tension (°) | 107.5 | 107.5 | 107.5 | 83.4 | 100 | 107.5 | 100 | 100 | 105 |
| Viscosity (cps) | 400 | 400 | 400 | 80 | 400 | 400 | 400 | 400 | 400 |
| Odor (level) | 3 | 3 | 3 | 4 | 3 | 3 | 3 | 3 | 3 |
| Whitening | X | X | X | X | ○ | ○ | ○ | ○ | ○ |

As shown in Table 2, in the case of the water-based surface treatment agents of Examples 1 to 3, which are prepared using the method of preparing a water-based surface treatment agent according to the present invention, whitening does not occur. In addition, compared to Comparative Example 1 using an oil-based surface treatment agent, antifouling properties are excellent, the amount of VOCs generated is significantly reduced, odor is not severe, and the upper surface of the base material is coated at a high density. On the other hand, in the cases of Reference Example 1 wherein the water-based solvent and the curing agent are not sufficiently stirred, Reference Example 3 wherein the water-based solvent is added to the curing agent, and Reference Example 4 wherein the main material and the curing agent are stirred first, whitening occurs, and surface crosslinking density is reduced.

In addition, in the case of Example 2 wherein the amount of the curing agent is much higher than the amount of the water-based solvent, whitening occurs In addition, in the case of Reference Example 5 wherein drying is not performed sufficiently after the water-based surface treatment agent is applied to a base material, whitening occurs, and surface crosslinking density is reduced.

DESCRIPTION OF SYMBOLS

1: LIQUID
θ: INTERNAL ANGLE

The invention claimed is:

1. A method of preparing a water-based surface treatment agent, comprising:

(a) adding 1 to 25 parts by weight of a curing agent (B) to 1 to 25 parts by weight of a water-based solvent (C) and performing stirring at 20 to 30° C. for 40 minutes to 5 hours;

(b) adding 1 to 10 parts by weight of a silicon compound (D), 0.1 to 0.5 parts by weight of an antifoaming agent and 0.1 to 0.5 parts by weight of a leveling agent to 100 parts by weight of a main material (A), and performing stirring at 20 to 30° C.; and (c) adding the mixture of step (a) to the mixture of step (b) and performing stirring at 20 to 30° C. for 0.2 to 1 hour, and wherein the water-based solvent (C) comprises water, an alcohol, or a mixture thereof, wherein the main material (A) is a main material (A-1), wherein the main material (A-1) comprises a polyurethane having one or more functional groups selected from the group consisting of a carboxylic acid group, a hydroxyl group, an amino group, and a combination thereof per molecule, dispersed in an amount of 5 to 30% by weight in a water-based solvent, and wherein the silicon compound (D) is a polysiloxane of a liquid form dispersed in water or a polysiloxane of a bead form, wherein a content of the polysiloxane in the silicon compound of a liquid form is 5 to 30% by weight.

2. The method according to claim 1, wherein, in step (a), the curing agent (B) comprises one or more functional groups selected from the group consisting of an aziridine group, an isocyanate group, and a carbodiimide group per molecule.

3. The method according to claim 1, wherein the polyurethane is a polycarbonate-based polyurethane.

* * * * *